Dec. 29, 1959 T. L. DIMOND 2,919,428

SELECTIVE SIGNALING RECEIVER

Filed May 2, 1957 2 Sheets-Sheet 1

INVENTOR
T. L. DIMOND
BY Kenneth B Hamlin
ATTORNEY

SELECTIVE SIGNALING RECEIVER

Filed May 2, 1957 2 Sheets-Sheet 2

INVENTOR
T. L. DIMOND
BY Kenneth B Hamlin
ATTORNEY

United States Patent Office 2,919,428

Patented Dec. 29, 1959

2,919,428

SELECTIVE SIGNALING RECEIVER

Thomas L. Dimond, Chatham, N.J., assignor to Bell Telephone Laboratories, Incorporated, New York, N.Y., a corporation of New York Application May 2, 1957, Serial No. 656,660

18 Claims. (Cl. 340—167)

This invention relates to electrical signaling systems and more particularly to selective signaling receivers for such systems.

Selective signaling systems to alert or call selected stations of a communications system or to control and supervise industrial operations from a remote control location are a necessary adjunct to modern industry. Coded ringing schemes, dial pulsing, etc. have long been used in communications systems and a variety of direct-current and alternating-current arrangements have been employed to supervise and control the operation of valves, switches, etc. in industry. In both communications systems and in industrial control, signaling system accuracy and reliability are of extreme importance. Both accuracy and reliability of such a system are enhanced by the careful choice of unambiguous electrical signals which are not readily mutilated by electrical noise and which inherently are easily detected. In addition to employing coherent electrical signals, an acceptable selective signal receiver must be free of spurious responses and must require a minimum amount of maintenance.

Heretofore signaling systems have employed a great variety of coding schemes, including the five element pulse length code advantageously employed in the present invention. The five elements of this code are designated, 0, 1, 2, 4 and 7 in typical two-out-of-five code fashion and comprise a train of five successive signal pulses, of which two are long pulses and three are short pulses. For example, the number 9 is represented in this five element pulse length code by a train of five successive signal pulses wherein code elements 2 and 7 are long pulses and code elements 0, 1 and 4 are short pulses.

Prior art devices to detect this type of coded signal have employed large numbers of relays or electromechanical switches and vacuum tubes. Such arrangements are generally bulky, consume considerable power and are subject to maintenance difficulties.

Accordingly, it is an object of this invention to increase the accuracy and operating margin of selective signal receivers.

It is a further object of this invention to reduce the power required to detect coded signals.

Still another object of this invention is to increase the reliability of selective signal receivers.

Concomitant to the above objects is the general object to reduce the size of selective signal receivers.

These and other objects are attained in one specific illustrative embodiment of a selective signaling receiver of the present invention wherein a nonreentrant magnetic core shift register, comprising a start core and two cores per stage for each code element, is employed to process five element pulse length coded input signals of the type described above and to provide an output signal when the input corresponds to the predetermined code for which the receiver is prearranged to respond. The shift register recognizes coded input signals in accordance with a pattern of selectively provided inhibit windings which are energized under control of the input signal pulses. If the input signal is the predetermined pulse length code to which the receiver is arranged to respond, each signal pulse thereof is effective to shift a stored information bit from one stage of the shift register to the next succeeding stage and upon receipt of a properly coded signal the receiver actuates alarm or control circuitry to alert a station or to perform a function such as the opening or closing of a valve or switch. The inhibit windings in the shift register are arranged so that if a short pulse occurs in a code element position which is reserved for a long pulse, the shift register will be temporarily disabled; therefore, upon receipt of an improperly coded input signal the receiver will not be effective to energize the alarm or control circuitry.

Similarly, the above-noted and other objects of this invention are attained in a second specific illustrative embodiment wherein a reentrant magnetic core shift register is advantageously employed in conjunction with a nonreentrant core per code element shift register. In this embodiment the reentrant shift register performs control and intermediate storage functions to effect the advance of a stored information bit through the stages of the nonreentrant register. The reentrant register is effective to substantially reduce the number of cores required per receiver where codes of more than one digit are to be recognized. Contacts of a control relay are placed in series with the advance windings of the nonreentrant register to disable the receiver whenever a short or long pulse occurs in a code element position reserved for the other type of pulse; therefore, an input signal which is the predetermined code for which the receiver is arranged to respond will be effective to provide a receiver output signal to the alarm or control circuitry while all other coded signals will temporarily disable the receiver.

Accordingly, it is a feature of the present invention to utilize magnetic cores having a substantially rectangular loop hysteresis characteristic to detect pulse length coded signals.

It is another feature of the present invention that an information bit be shifted from stage to stage in a magnetic core shift register in response to the reception of the successive signal pulse of a predetermined pulse length code and that the shift register provide an output signal only when the predetermined pulse length code has been received.

It is a further feature of the present invention that an information bit be shifted from stage to stage in a magnetic core shift register in response to the reception of the successive signal pulses of pulse length codes and that the shifting of the information bit be blocked in response to the reception of all except a single predetermined pulse length code.

It is another feature of the present invention that a reentrant magnetic core shift register control the shifting of an information bit from stage to stage in a nonreentrant magnetic core shift register in response to the reception of the successive signal pulses of pulse length codes.

The invention and the above-noted and other features thereof will be understood more fully and clearly from the following detailed description with reference to the accompanying drawing in which.

Figures 1, 2:
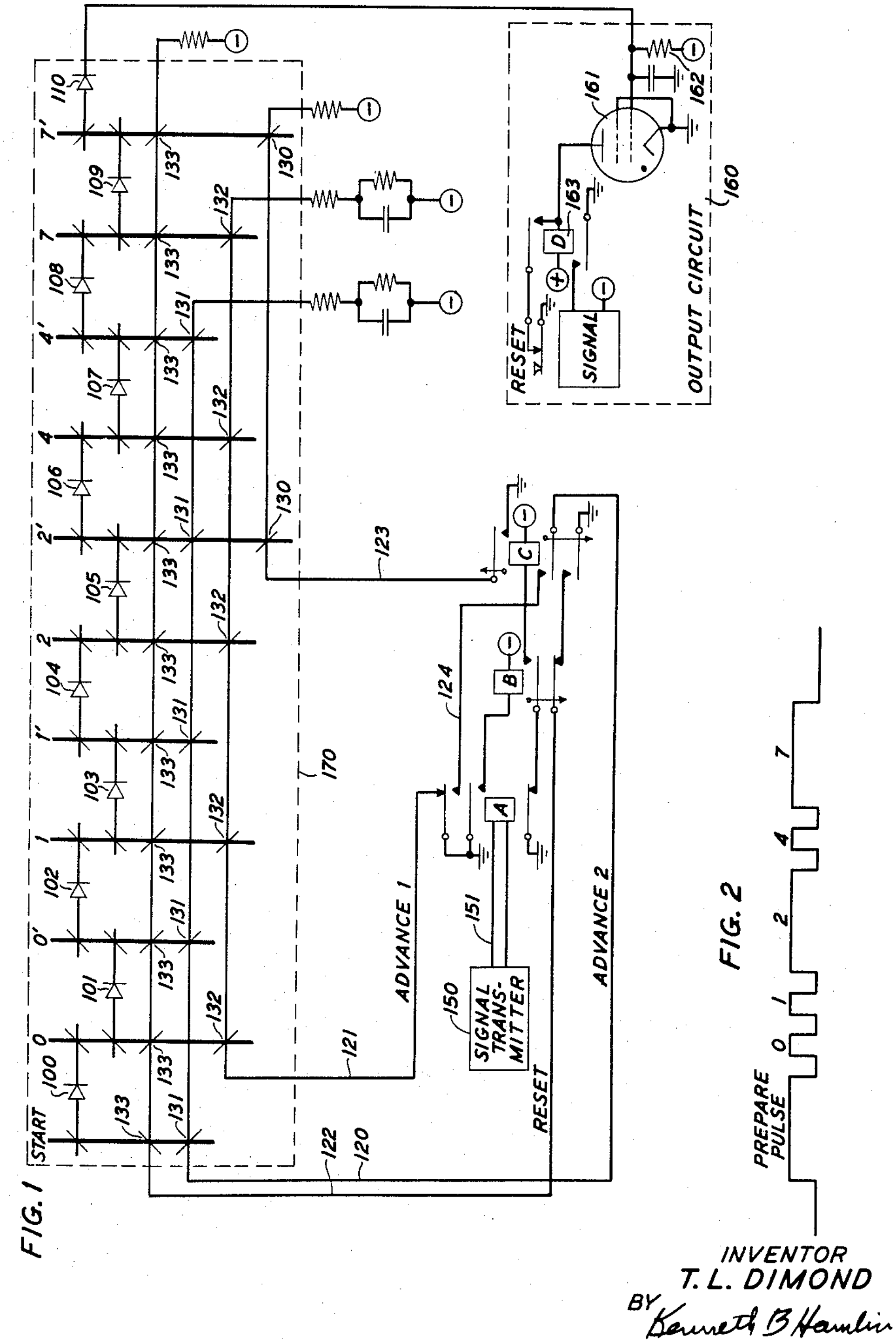
Fig. 1 is a schematic representation of one specific illustrative embodiment of this invention.
Fig. 2 is a graphical representation of an illustrative one digit pulse length code employed in this invention.
Figures 3, 4, 5, 6:
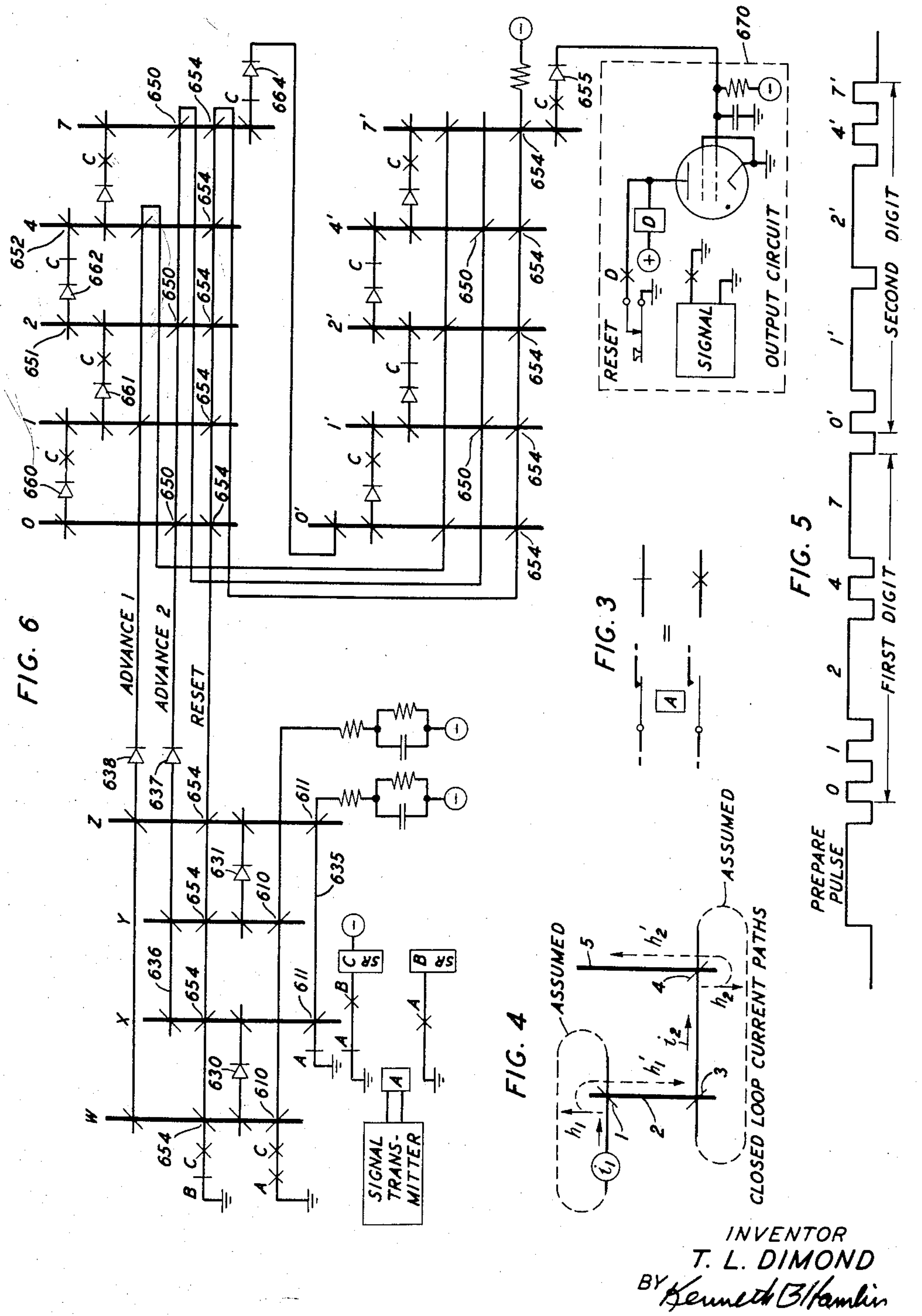
Fig. 3 illustrates the relay symbolism employed in Fig. 6 of the drawing.
Fig. 4 illustrates the magnetic core symbolism employed in Figs. 1 and 6 of the drawing.
Fig. 5 is a graphical representation of an illustrative two digit pulse length code employed in this invention.
Fig. 6 is a schematic representation of a second specific illustrative embodiment of this invention.

Reference is made to the core symbolism of Fig. 4 for the purpose of promoting an understanding of the symbols of Figs. 1 and 6. This figure depicts mirror symbols which are discussed extensively in an article entitled "Pulse Switching Circuits Using Magnetic Cores," by M. Karnaugh, published in Proceedings of the IRE, volume 43, No. 5, pages 570 through 583.

As depicted in Fig. 4 of the accompanying drawing, the heavy vertical lines each represent a magnetic core comprising material having a substantially rectangular hysteresis loop characteristic. The short lines defining 45 degree angles with the cores represent windings on the core and are termed winding mirror symbols. The horizontal lines through the intersection of these heavy vertical and light 45 degree lines represent the circuits connected to the windings. When a current flows into a winding, the resultant magnetic flux can be obtained by reflecting this current off the winding mirror symbol. In order to determine the current induced in the remaining windings of the magnetic core, the flux lines so produced are projected around the end of the magnetic core and are reflected off each remaining winding mirror symbol. As shown in Fig. 4, $i_1$ is the current directed into winding 1 of ferromagnetic core 2, and the resultant flux is illustrated by an arrow designated $h_1$. The flux $h_1$ is projected around the end of the core and called $h_1'$. By projecting $h_1'$ upon winding 3 of core 2 the direction of current $i_2$ is determined as being to the right. Similarly, when current $i_2$ is applied to winding 4 of core 5 a flux $h_2$ will be produced in the downward direction. A magnetic field applied upward is assumed to place a core in its "set" or "1" state and a field applied downward will place a core in its "reset" or "0" state.

In Figs. 1 and 6 it is assumed that each core winding comprises a suitable number of turns to cause the circuit to operate as described herein.

Now with reference to the drawing, the specific illustrative embodiment represented by the schematic of Fig. 1 is arranged to recognize one digit pulse length code signals and comprises the A, B and C control relays, the shift register 170, which comprises a start core and two cores per code element, and the output circuit 160, which when activated by a signal from the shift register is effective to provide a station alarm or to perform a control function.

The signal transmitter 150 is arranged to send one digit pulse length code signals of the type shown in Fig. 2. For purposes of illustration, the receiver of Fig. 1 is arranged to recognize a code signal representative of the digit 9.

As a starting point in the explanation of Fig. 1, it is assumed that the start core has been previously set up to the "1" state and that the remaining cores of the shift register have been reset down to the "0" state. As the discussion proceeds, it will become obvious how this state of affairs is attained.

The A relay, connected to line 151, is a fast operate and release relay which is arranged to follow the signal transitions which occur on line 151. The B relay is a slow release relay which will hold up during the short interpulse periods, and the C relay is a slow release relay which will hold up over a short pulse period but which will release during a long pulse period. Upon receipt of a prepare pulse, as shown at the lefthand side of Fig. 2, the A relay operates and through an upper front contact effects operation of the B relay, which in turn through a lower front contact prepares an operating path for the C relay. At the termination of the prepare pulse the A relay releases and through its lower back contact completes the previously mentioned operating path for the C relay which at this time operates. The B relay, having a slow release characteristic, remains operated during the period that the A relay is released between the termination of the prepare pulse and the start of the 0 pulse. The 0 pulse reoperates the A relay which opens the operating path for the C relay; however, since the C relay has a slow release characteristic, it will remain operated during the period of a short 0 pulse. Operation of the A relay completes a path over an upper front contact of the A relay and a lower front contact of the C relay via lead 120 to energize the advance windings 131 of the Start, 0′, 1′, 2′ and 4′ cores. As previously mentioned, the Start core was assumed to have been previously set up to its "1" state. The advance pulse on conductor 120 resets the Start core down to its "0" state and this effects the setting of the 0 core to the "1" state by the induced current through diode 100. Upon termination of the 0 pulse the A relay releases completing a circuit through its upper back contact and conductor 121 to energize advance windings 132 on cores 0, 1, 2, 4, and 7. The advance pulse on conductor 121 resets core 0 down to its "0" state and effects the setting of core 0′ up to its "1" state by the induced current through diode 101. From the above it can be seen that the receipt of a short pulse causes a stored bit to transfer from the Start core to the 0 intermediate storage core and termination of the short pulse causes the stored bit to be transferred from the intermediate storage core to the 0′ core. Similarly, the short 1 pulse will effect transfer of the stored bit from the 0′ core to the 1 intermediate storage core and termination of the 1 pulse will effect transfer of the stored bit to the 1′ core.

At this time it should be noted that inhibit windings 130 on cores 2′ and 7′ are energized over a path which includes ground, the upper front contact of relay C, conductor 123 and negative battery. The receipt of the long 2 pulse will reenergize the A relay which in turn over a path including its upper front contact, conductor 124, the lower front contact of relay C and conductor 120, will effect energization of the advance windings 131; therefore, the bit stored in the 1′ core will be transferred via diode 104 to the 2 core. Since the 2 pulse is of longer duration than its holding period, the C relay will release and thereby deenergize inhibit windings 130. Termination of the long 2 pulse will restore the A relay to normal which in turn energizes conductors 121 and advance windings 132 to effect transfer of the stored bit from the 2 to the 2′ core via diode 105. Had a short pulse been received in this code element position, the C relay would have remained energized and transfer to the 2′ core would have been inhibited since inhibit windings 130 would have been energized.

As in the case of the 0 and 1 pulses, the short 4 pulse will cause the stored bit to be transferred from the 2′ to the 4 core via diode 106 and from the 4 core to the 4′ core via diode 107. And again, as in the case of the long 2 pulse, the long 7 pulse will transfer the stored energy bit from the 4′ core to the 7 core via diode 108. Because the C relay releases during the period of the 7 pulse, inhibit windings 130 will be deenergized and the termination of the long 7 pulse effects transfer of the stored bit from the 7 core to the 7′ core to set this latter core up to its "1" state.

The resetting of the 7′ core to the "1" state applies a positive pulse to the grid of tube 161 in output circuit 160. Tube 161 is normally biased to its nonconducting state by the negative potential applied through resistor 162. Receipt of the positive pulse through diode 110 causes this tube to fully conduct and effects operation of the D relay 163 which locks over an operating path which includes back contacts of the reset key and an upper front contact of the D relay.

For purposes of illustration the D relay has been shown to effect operation of a signal which can be extinguished by depression of the reset key. It is readily understood that any kind of electrically operated device may advantageously be similarly controlled by the operation of the D relay and that reset of the D relay could be effected by contacts operated under control of the controlled device rather than through manual reset means.

It can be seen that Fig. 1, which is arranged to accept the code signal having long pulses in the 2 and 7 positions representative of the numeral 9, has inhibit windings on the similarly numbered prime cores. Receipt of a signal other than the one for which the device is connected will have no effect on the output circuit because when an attempt is made to transfer a short pulse in place of a long pulse the inhibit windings 130 will prevent the transfer of the stored bit, and at the termination of a code signal the stored bit will not have progressed the full length of the shift register.

In the above example upon termination of the 7 pulse the A relay returns to normal, opens the operating path for the B relay, and reenergizes the C relay. After a short period of time the B relay releases breaking the operating path for the C relay and completing a path for energizing the reset windings 133 on all cores over a path which includes ground, a lower front contact of the C relay, the lower back contact of the B relay, conductor 122 and negative battery. The pulse on the reset conductor 122 sets the Start core up to its "1" state and sets all other cores down to their "0" state. The circuit of Fig. 1 is now in the state assumed at the beginning of this discussion.

Fig. 6 is a schematic representation of an illustrative embodiment of a two digit signal receiver in accordance with the present invention which employs a reentrant 4 core shift register comprising cores W, X ,Y and Z to advantageously eliminate the need for the intermediate storage cores of Fig. 1. In this figure the detached contact relay symbolism of Fig. 3 has been adopted to simplify the drawing and to establish a better understanding of the theory of operation, as the plurality of contacts on the C relay and the attendant wiring to the cores would unduly clutter the drawing and mask its mode of operation. By way of illustration the signal receiver of Fig. 6 is arranged to receive and respond to the two digit pulse length code which is shown in Fig. 5 representative of the number 93. In the first digit, the 2 and 7 pulses are long and in the second digit, 1′ and 2′ pulses are long. It should be noted that as in Fig. 2 a long prepare pulse precedes the train of code signals. The operation of the A, B and C relays of Fig. 6 is the same as the operation of their counterparts in Fig. 1. That is, the A relay follows pulses on the line from the signal transmitter, the B relay operates under control of the A relay and remains operated during the normal interpulse period, the C relay operates upon release of the A relay when the B relay is energized and remains operated during the period of short pulses and releases during long pulses.

As a starting point, it is assumed that the W core and the 0 core have been previously set up to their "1" state and all other cores have been set down to their "0" state. The beginning of the prepare pulse causes the A relay to operate, which in turn operates the B relay to prepare an operate path for the C relay. Termination of the prepare pulse releases the A relay which completes the operate path for the C relay. At this point the cores are in the states previously mentioned. The 0 pulse reoperates the A relay which in turn completes the energizing path for the advance windings 610 on cores W and Y. Energization of advance windings 610 resets core W to its "0" state and effects transfer of the bit stored in the W core to the X core through diode 630 to set the X core up to its "1" state. Upon termination of the short 0 pulse the A relay releases and completes a path including ground, conductor 635 and negative battery to energize the advance windings 611 on cores X and Z. This is effective to reset core X to its "0" state and transfer the stored bit from the X core to the Y core via conductor 636 to set the Y core up to its "1" state and to energize, through diode 637, the advance windings 650 on the 0, 2 and 7 cores and 1′ and 4′ cores in the nonreentrant shift register. Energization of advance winding 650 on the 0 core transfers the bit stored in the 0 core to the 1 core via diode 660 and a front contact of relay C to set core 1 up to its "1" state. In summary, the short 0 pulse effected transfer of the stored bit from the W to the X core, and termination of the 0 pulse effected transfer of the stored bit from the X core to the Y core and transferred the bit stored in the 0 core to the 1 core. A short pulse, therefore, shifts an energy bit two stages in the reentrant register and a stored bit one stage in the nonreentrant register.

Similarly, the short 1 pulse causes the stored bit to be transferred from the Y to the Z core, and termination of the 1 pulse causes the bit to be transferred back to the W core and, at the same time, causes the bit which is stored in the 1 core to be transferred to the 2 core via diode 661 and a front contact of the C relay to set the 2 core up to its "1" state. The long 2 pulse reoperates the A relay to transfer the stored bit from the W core to the X core. During the period of the 2 pulse the C relay releases, thereby closing a path through diode 662 and a back contact of the C relay which is in series with the output winding 651 of core 2 and the input winding 652 of core 4. Termination of the long 2 pulse releases the A relay which advances the stored bit from the X core to the Y core and energizes the advance winding 650 on core 2 to set this core down to its "0" state and provide an output on winding 651 to thereby energize the input winding 652 of core 4. Had a short pulse occurred at this point, the C relay would not have released and the path between output winding 651 of core 2 and the input winding 652 of core 4 would not have been completed and transfer of the stored bit would have been prevented. In a similar manner the succeeding short and long pulses will effect transfer of the stored bits through the reentrant register and through the nonreentrant register until a signal is provided to the output circuit 670 through diode 655 if the input signal is the predetermined two digit code for which the receiver is arranged to respond. A signal other than the one for which the receiver is arranged will have no effect on the output circuit 670 as the transfer of the stored bit in the nonreentrant register will be stopped whenever a pulse of improper duration occurs. At the termination of the train of pulses, the A relay will be restored completing the energizing path of the C relay and breaking the energizing path for the B relay. Shortly thereafter the B relay will release to complete the energizing circuit for the reset windings 654 on all cores to effect setting of the W and 0 cores up to their "1" state and to set all other cores down to their "0" state, as was the situation assumed at the beginning of the discussion of Fig. 6.

As in the case of Fig. 1, the output circuit shown is a simple signaling arrangement which locks up through a manual reset means and, as in Fig. 1, the work performed by the receipt of a properly coded signal is not limited to this simple function but rather may be any control function.

The above arrangements are by way of illustration only and it is to be understood that these in no way limit the scope of the invention, as it is obvious to one skilled in the art that many other combinations of the teachings herein are possible. For example, the inhibit windings 130 of Fig. 1 could be equally successfully applied to the numbered cores of Fig. 6, and similarly the relay contacts of Fig. 6 could similarly be employed in the transfer circuits of Fig. 1. Further, where faster operation is required, the control relays of both Figs. 1 and 6 could be easily replaced by well known flip-flop and logic circuitry having properly chosen operate and restore periods. Further, this invention is not limited to one or two digit pulse length code signals but could be advantageously employed to respond to plural digit code signals.

It is to be understood that the above-described arrangements are illustrative of the application of the principles of this invention. Numerous other arrangements may be devised by those skilled in the art without departing from the spirit and scope of the invention.

What is claimed is:

1. A selective signaling receiver responsive to a predetermined code input signal of successive short and long signal pulses comprising in combination, control means responsive to each transition of said signal pulses, a shift register comprising a plurality of magnetic cores, each of said cores having two stable magnetic states characterized as set and reset, first means controlled by said control means to set one of said cores and to reset the remainder of said cores, second means controlled by said control means to sequentially switch the magnetic state of said cores and inhibiting means controlled by said control means for disabling said shift register in response to an input signal other than said predetermined code.

2. The combination defined in claim 1 in combination with output means controlled by said shift register for providing an output signal in response to the reception of an input signal corresponding to said predetermined code.

3. A selective signaling receiver responsive to a predetermined code input signal of successive short and long signal pulses comprising in combination, control means responsive to each transition of said signal pulses, a shift register comprising a series of magnetic cores, said series comprising a first and a second plurality of cores, each of said cores having two stable magnetic states characterized as set and reset, input, output and advance windings on said cores, a plurality of coupling means, each of said coupling means connecting the output winding of one of said cores to the input winding of another of said cores, first circuit means serially connecting the advance windings of said first plurality of cores, second circuit means serially connecting the advance windings of said second plurality of cores, first means controlled by said controlled means to set one of said cores and to reset the remainder of said cores, second means controlled by said control means for alternately energizing said first and said second circuit means to sequentially switch the magnetic state of said cores, and inhibiting means controlled by said control means for disabling said shift register in response to an input signal other than said predetermined code.

4. The combination defined in claim 3 in combination with output means connected to the output winding of the last core of said series and operative when said last core is set.

5. The combination defined in claim 4 wherein said first means controlled by said control means comprises a reset winding on each of said cores, third circuit means serially connecting said reset windings, the sense of one of said windings being such that the core inductively coupled thereto is set and the sense of the remainder of said windings being such that the cores inductively coupled thereto are reset when said third circuit means is energized, and means controlled by said first control means and operative a predetermined time following the last transition of the signal pulses of said coded input signal for energizing said third circuit means.

6. The combination defined in claim 3 wherein said inhibiting means controlled by said control means comprises inhibit windings on predetermined ones of said cores and means controlled by said control means and operative in response to an input signal other than said predetermined code for energizing said inhibit windings.

7. A selective signaling receiver responsive to a predetermined code input signal of successive short and long signal pulses comprising in combination control means responsive to each transition of said signal pulses, distinguishing means for distinguishing between short and long signal pulses of said input signal, a shift register comprising a plurality of magnetic cores, each of said cores having two stable magnetic states characterized as set and reset, first means controlled by said control means to set one of said cores and to reset the remainder of said cores, second means including said control means to sequentially switch the magnetic state of said cores, and inhibiting means associated with certain of said cores and controlled by said distinguishing means for disabling said shift register in response to an input signal other than said predetermined code.

8. The combination defined in claim 7 wherein said inhibiting means comprises inhibit windings on predetermined ones of said magnetic cores, circuit means serially connecting said inhibit windings and means controlled by said distinguishing means for energizing said circuit means in response to an input signal other than said predetermined code.

9. A selective signaling receiver responsive to a predetermined code input signal of successive short and long signal pulses comprising in combination first relay means responsive to each transition of said signal pulses, second relay means controlled by said first relay means for distinguishing between said short and said long signal pulses, a shift register comprising a series of magnetic cores, said series comprising a first and a second plurality of cores, each of said cores having two stable magnetic states characterized as set and reset, input, output and advance windings on said cores, a plurality of coupling means, each of said coupling means connecting the output winding of one of said cores to the input winding of another of said cores, first circuit means serially connecting the advance windings of said first plurality of cores, second circuit means serially connecting the advance windings of said second plurality of cores, first control means including said first and said second relay means to set one of said cores and to reset the remainder of said cores, second control means including said first and said second relay means for alternately energizing said first and said second circuit means to sequentially switch the magnetic state of said cores, and inhibiting means controlled by said second relay means for disabling said shift register in response to an input signal other than said predetermined code.

10. The combination defined in claim 9 wherein said inhibiting means comprises windings on predetermined ones of said cores in accordance with a code and energized by said second relay means for temporarily blocking the sequential switching of said remainder of said cores.

11. The combination defined in claim 9 wherein said inhibiting means comprises contacts of said second relay means in circuit with certain of said coupling means.

12. A selective signaling receiver responsive to a predetermined code input signal of successive short and long signal pulses comprising in combination control means responsive to each transition of said signal pulses, a first magnetic core shift register, a second magnetic core shift register, each of the cores of said shift registers having two stable magnetic states characterized as set and reset, first means controlled by said controlled means to set one core in each of said shift registers and to reset the remainder of the cores in each of said shift registers, means controlled by said control means to sequentially switch the magnetic state of the cores in said first shift register, means controlled by said first shift register to sequentially shift the magnetic state of the cores in said second shift register, and inhibiting means controlled by said control means for disabling said second shift register when said input signal is other than said predetermined code.

13. The combination defined in claim 12 wherein said means controlled by said first shift register to sequentially switch the magnetic state of the cores in said second shift register comprises input, output and advance windings on each of said cores in said second shift register, a plurality of coupling means, each of said coupling means connecting the output winding of one core of said second shift register to the input winding of another core of said second shift register, a first circuit means serially connecting the advance windings of certain of the cores of said second shift register, a second circuit means serially connecting the advance windings of others of the cores of said second shift register, and means including said first shift register for alternately energizing said first and said second circuit means to sequentially switch the magnetic state of the cores of said second shift register.

14. The combination defined in claim 13 in combination with means controlled by said second shift register for providing an output signal in response to the reception of an input signal corresponding to said predetermined code.

15. A selective signaling receiver responsive to a predetermined code input signal of successive short and long signal pulses comprising in combination first relay means responsive to each transition of said signal pulses, second relay means controlled by said first relay means and operative during the reception of said signal pulses, third relay means controlled by said first relay means for distinguishing between said short and said long signal pulses, a first magnetic core shift register, a second magnetic core shift register, each of the cores of said shift registers having two stable magnetic states characterized as set and reset, input, output, advance, and reset windings on said cores, first circuit means serially connecting said reset windings of said shift registers, the sense of the reset windings on one core of each of said shift registers being such that the core inductively coupled thereto is set and the sense of the reset windings on the remainder of the cores in each of said shift registers being such that the cores inductively coupled thereto are reset when said first circuit means is energized, means controlled by said second and said third relay means for energizing said first circuit means a predetermined time following the last transition of the signal pulses of said coded input signal, a plurality of coupling means, each of said coupling means connecting the output winding of one of said cores to the input winding of another of said cores, a second circuit means serially connecting the advance windings of certain of the cores of said first shift register, a third circuit means serially connecting the advace windings of others of the cores of said first shift register, means including said first and said third relay means for alternately energizing said second and said third circuit means to sequentially switch the magnetic state of the cores of said first shift register, fourth circuit means serially connecting the advance windings of certain of the cores of said second shift register, fifth circuit means serially connecting the advance windings of others of the cores of said second shift register, means including said first shift register and responsive to the switching of the cores therein for alternately energizing said fourth and said fifth circuit means to sequentially switch the magnetic state of the cores of said second shift register, inhibiting means controlled by said third relay means for disabiling said second shift register in response to an input signal other than said predetermined code, and means connected to the last core of said second shift regster and operative when said last core is set for providing an output signal.

16. The combination defined in claim 15 wherein said inhibiting means comprises contacts of said third relay means in circuit with certain of said coupling means in said second shift register.

17. An electrical circuit comprising a first plurality of magnetic cores, a second plurality of magnetic cores, input, output, and advance windings inductively coupled to said cores, a plurality of coupling means for connecting the output windings of each of the cores of said first plurality of cores to the input windings of said second plurality of said cores, inhibiting windings inductively coupled to particular ones of said cores, a first circuit means serially connecting the advance windings of said first plurality of cores, a second circuit means serially connecting the advance windings of said second plurality of cores, means for alternately energizing said first and said second circuit means responsive to said pulse length code input signals, and means for applying inhibiting currents to said inhibiting windings.

18. A pulse length code receiver comprising in combination a magnetic core shift register, each of the cores of said shift register having two stable states characterized as set and reset, advance circuits to sequentially switch the magnetic state of said cores, means responsive to pulse length code input signals for energizing said advance circuits, means for inhibiting particular ones of said cores, and means responsive to said pulse length code input signals for controlling said inhibiting means.

References Cited in the file of this patent

UNITED STATES PATENTS

| | | |
|---|---|---|
| 2,637,017 | Holden | Apr. 28, 1953 |
| 2,784,049 | Mitchell | Mar. 5, 1957 |

OTHER REFERENCES

Proceedings of the I.R.E., June 1950, pp. 626–629.

Journal of Applied Physics, January 1950, pp. 49–54.